United States Patent
Amarilio et al.

(10) Patent No.: US 10,359,827 B1
(45) Date of Patent: Jul. 23, 2019

(54) SYSTEMS AND METHODS FOR POWER CONSERVATION IN AN AUDIO BUS

(71) Applicant: QUALCOMM Incorporated, San Diego, CA (US)

(72) Inventors: Lior Amarilio, Yokneam (IL); Sandeep Kumar, Navi Mumbai (IN); Suman Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/998,433

(22) Filed: Aug. 15, 2018

(51) Int. Cl.
| G06F 1/32 | (2019.01) |
| G06F 1/06 | (2006.01) |
| G06F 1/10 | (2006.01) |
| G06F 3/16 | (2006.01) |
| G06F 1/3203 | (2019.01) |
| G06F 9/30 | (2018.01) |

(52) U.S. Cl.
CPC ............ *G06F 1/3203* (2013.01); *G06F 1/06* (2013.01); *G06F 1/10* (2013.01); *G06F 3/162* (2013.01); *G06F 9/30141* (2013.01)

(58) Field of Classification Search
None
See application file for complete search history.

(56) References Cited

U.S. PATENT DOCUMENTS

| 8,514,994 | B1 | 8/2013 | Lee |
| 9,252,900 | B2 | 2/2016 | Poulsen |
| 9,436,633 | B2 | 9/2016 | Segev et al. |
| 9,626,981 | B2 | 4/2017 | Chesney |
| 9,779,465 | B2 | 10/2017 | Kim et al. |
| 2007/0283182 | A1 | 12/2007 | Defazio et al. |
| 2009/0055005 | A1 | 2/2009 | Oxman et al. |
| 2009/0129505 | A1 | 5/2009 | Ware et al. |
| 2009/0310433 | A1 | 12/2009 | Caltagirone et al. |
| 2012/0278646 | A1 | 11/2012 | Gruber et al. |
| 2013/0322462 | A1* | 12/2013 | Poulsen ............... H04J 3/06 370/458 |
| 2016/0124892 | A1 | 5/2016 | Amarilio et al. |
| 2016/0306382 | A1 | 10/2016 | Amarilio et al. |
| 2016/0366206 | A1 | 12/2016 | Shemer et al. |
| 2017/0289679 | A1 | 10/2017 | Amarilio et al. |
| 2018/0048744 | A1 | 2/2018 | Bhat Noojady Krishna et al. |

* cited by examiner

*Primary Examiner* — Mark Fischer
(74) *Attorney, Agent, or Firm* — Withrow & Terranova, PLLC (57) ABSTRACT

A number of ones in the difference between a current pulse code modulated (PCM) audio sample and an immediately preceding audio sample is compared to a number of ones in the current audio sample to determine which has the fewer number of ones. The audio source sends either the difference or the current audio sample, whichever has fewer ones. By reducing the number of ones sent over a non-return to zero inverted (NRZI) audio bus from an audio source to an audio sink, the number of transitions is reduced, which reduces the power consumed relative to a transmission that does not use this process.

27 Claims, 7 Drawing Sheets

SYSTEMS AND METHODS FOR POWER CONSERVATION IN AN AUDIO BUS

BACKGROUND

I. Field of the Disclosure

The technology of the disclosure relates generally to audio buses and, more particularly, to controlling power consumption on audio buses.

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

The mobile communication devices commonly include at least one microphone and multiple speakers. The microphone and the speakers used in the mobile communication devices typically have analog interfaces which require a dedicated two-wire connection between each pair of devices. Since a mobile communication device is capable of supporting multiple audio devices, it may be desired to allow a microprocessor or other control device in the mobile communication device to communicate audio data to multiple audio devices over a common communication bus simultaneously.

In this regard, the MIPI® Alliance initially developed the Serial Low-power Inter-chip Media Bus (SLIMbus$^{SM}$ or SLIMBUS) to handle audio signals within a mobile communication device. The first release was published in October 2005 with v1.01 released on Dec. 3, 2008. In response to industry feedback, MIPI has also developed Sound-Wire$^{SM}$ (SOUND WIRE), a communication protocol for a processor in the mobile communication device (the "master") to control distribution of digital audio streams between one or more audio devices (the "slave(s)") via one or more SOUNDWIRE slave data ports. Version 1 was released Jan. 21, 2015.

Both SLIMBUS and SOUNDWIRE rely on non-return to zero inverted (NRZI) encoding at the transport layer to place data on the bus. NRZI is a two-level signal, where the presence or absence of a transition of the signal at a clock boundary is used to signal a one (1) or a zero (0). That is, if a one is being transmitted, the data line transitions at the clock signal and if a zero is being transmitted, the data line maintains the signal without a transition. It should be appreciated that each transition consumes more power than the absence of a transition. Given that statistically approximately 50% of a signal will be formed from ones, a large number of ones are present in a given audio stream with corresponding power consumption.

SUMMARY OF THE DISCLOSURE

Aspects disclosed in the detailed description include systems and methods for power conservation in an audio bus. In an exemplary aspect, a number of ones in the difference between a current pulse code modulated (PCM) audio sample and an immediately preceding audio sample is compared to a number of ones in the current audio sample to determine which has the fewer number of ones. The audio source sends either the difference or the current audio sample, whichever has fewer ones. By reducing the number of ones sent over a non-return to zero inverted (NRZI) audio bus from an audio source to an audio sink, the number of transitions is reduced, which reduces the power consumed relative to a transmission that does not use this process.

In this regard in one aspect, a method for handling data on an audio bus is disclosed. The method includes sending a first PCM audio sample to an audio sink over an NRZI audio bus. The method also includes determining a difference value reflecting a difference in a first number of ones in the first PCM audio sample to a second number of ones in a second PCM audio sample. The method also includes, when the second number of ones is less than the difference value, sending the second PCM audio sample to the audio sink. The method also includes, when the second number of ones is greater than the difference value, sending the difference value to the audio sink.

In another aspect, an audio source is disclosed. The audio source includes an audio bus interface configured to be coupled to an NRZI audio bus. The audio source also includes a transmitter configured to send a first PCM audio sample to an audio sink over the NRZI audio bus. The audio source also includes a control system. The control system is configured to determine a difference value reflecting a difference in a first number of ones in the first PCM audio sample to a second number of ones in a second PCM audio sample. When the second number of ones is less than the difference value, the control system is configured to cause the transmitter to send the second PCM audio sample to the audio sink. When the second number of ones is greater than the difference value, the control system is configured to cause the transmitter to send the difference value to the audio sink.

In another aspect, an audio sink is disclosed. The audio sink includes an audio bus interface configured to be coupled to an NRZI audio bus. The audio sink also includes a receiver configured to receive a first PCM audio sample from an audio source over the NRZI audio bus. The audio sink also includes a control system. The control system is configured to detect an indication that a difference value has been sent from the audio source over the NRZI audio bus. The control system is also configured to determine a direction of a difference from a sign indication. The control system is also configured to use the difference value and the direction of the difference with the first PCM audio sample to derive a second PCM audio sample. The control system is also configured to pass the second PCM audio sample to a demodulator.

In another aspect, a non-transitory computer-readable medium is disclosed having stored thereon computer executable instructions. The instructions, when executed by a processor, cause the processor to send a first PCM audio sample to an audio sink over an NRZI audio bus. The instructions also cause the processor to determine a difference value reflecting a difference in a first number of ones in the first PCM audio sample to a second number of ones in a second PCM audio sample. When the second number of ones is less than the difference value, the instructions cause the processor to send the second PCM audio sample to the audio sink. When the second number of ones is greater than the difference value, the instructions cause the processor to send the difference value to the audio sink.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for power conservation in an audio bus. In an exemplary aspect, a number of ones in the difference between a current pulse code modulated (PCM) audio sample and an immediately preceding audio sample is compared to a number of ones in the current audio sample to determine which has the fewer number of ones. The audio source sends either the difference or the current audio sample, whichever has fewer ones. By reducing the number of ones sent over a non-return to zero inverted (NRZI) audio bus from an audio source to an audio sink, the number of transitions is reduced, which reduces the power consumed relative to a transmission that does not use this process.

Before addressing exemplary power saving processes for NRZI audio buses carrying PCM-encoded audio samples, a brief overview of two exemplary audio systems are provided with reference to FIGS. 1-4. In particular, a Serial Low-power Inter-chip Media Bus (SLIMBUS) audio system and a SOUNDWIRE audio system are discussed as they may benefit from exemplary aspects of the present disclosure. Additionally, a conventional SOUNDWIRE frame is illustrated in FIG. 5. Exemplary processes enabling such systems are illustrated beginning at FIG. 6.

Figure 1:
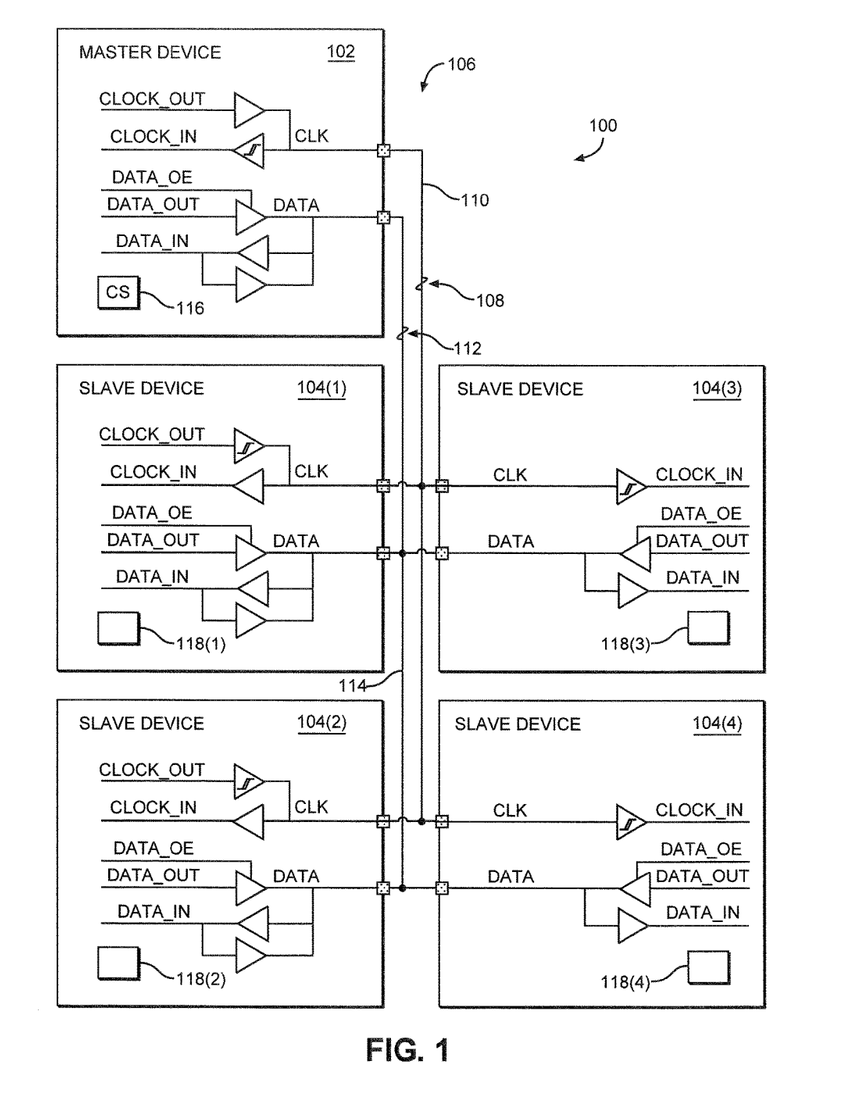
FIG. 1 is a block diagram of an exemplary audio system using a Serial Low-power Inter-chip Media Bus (SLIM- BUS) audio bus to transport audio data that incorporates exemplary power conservation techniques.

In this regard, a computing device may include an audio system such as a SLIMBUS audio system such as audio system 100 illustrated in FIG. 1. The audio system 100 may include a master 102 (sometimes referred to as a master device, but since "device" sometimes has specific connotations, primarily referenced as simply "master" hereinafter) and slave devices 104(1)-104(4) communicatively coupled to a SLIMBUS audio bus 106 as components. In an exemplary aspect, the slave devices 104(1)-104(4) may be microphones, speakers, or other audio devices and thus may be audio sources (i.e., components that place audio data onto the SLIMBUS audio bus 106) or audio sinks (i.e., components that receive audio data from the SLIMBUS audio bus 106). The master 102 may be an application processor, a codec, or a modem, and communicates with the slave devices 104(1)-104(4) using two signals: a clock signal 108 communicated over a common clock wire 110, and a data signal 112 communicated on a common data wire 114. While only four slave devices 104(1)-104(4) are illustrated in FIG. 1, it should be appreciated that more or fewer components may be coupled to the SLIMBUS audio bus 106. It should be appreciated that the master 102 may have a control system (CS) 116 associated therewith, which may be a hardware implemented processor with associated software stored in memory associated with the processor. In an exemplary aspect, the control system 116 is part of a system on a chip (SoC) of the master 102. In further exemplary aspects, the slave devices 104(1)-104(4) each have a respective slave control system 118(1)-118(4).

Figure 6:
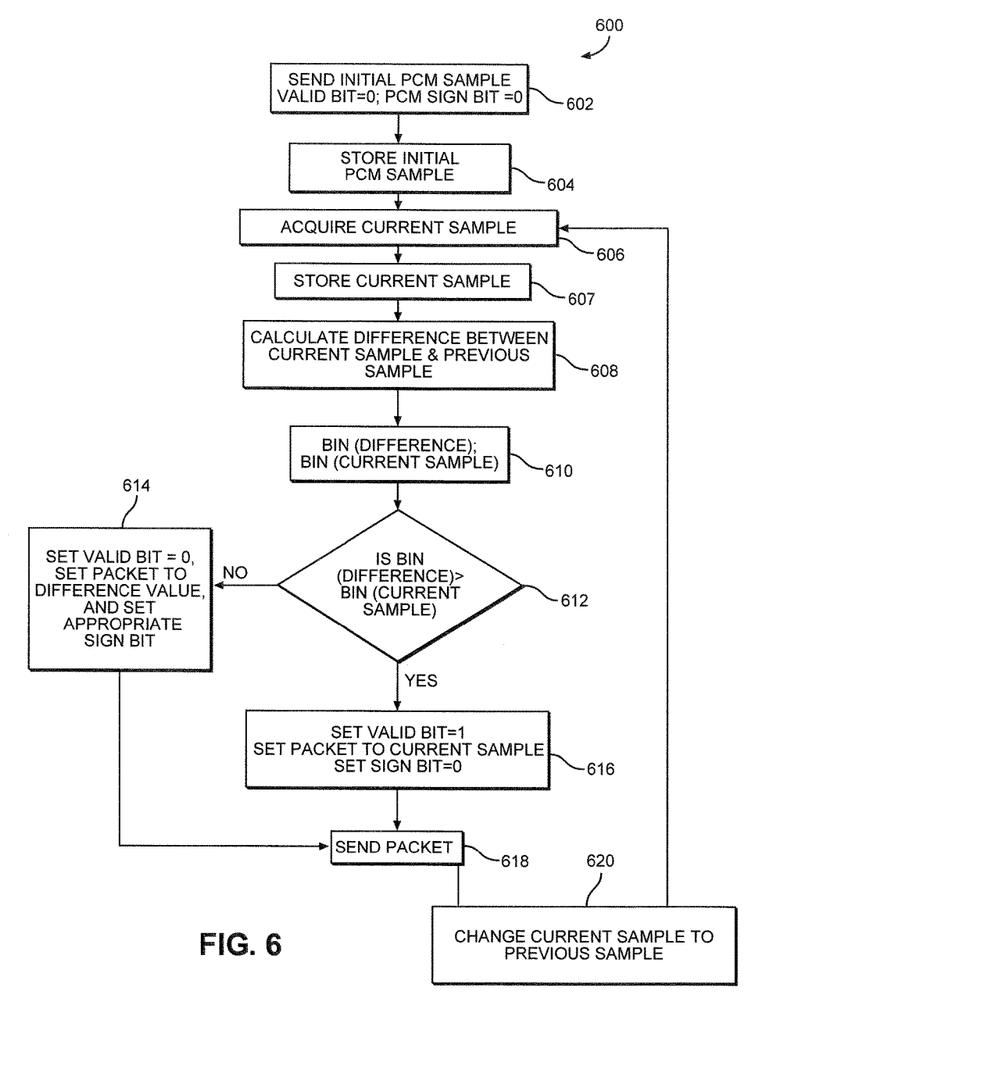
FIG. 6 is a flowchart illustrating an exemplary process for reducing power consumption by consolidation of transitions according to an exemplary aspect of the present disclosure.

As noted above, the audio system 100 may use an NRZI encoding scheme to transport PCM-encoded audio data across the SLIMBUS audio bus 106 and may implement the process of FIG. 6 to determine whether it is more efficient to send a current audio sample or send the delta (e.g., the difference) between the current audio sample and the previous audio sample. In an exemplary aspect, the determination is done by counting a number of ones in the current audio sample and counting the number of ones in the delta and selecting whichever has the fewer number of ones. Thus, if the function $f$ is a binning function that calculates a number of ones in an audio sample, this comparison may be represented as Equation 1 (Eq. 1) below, where n is the current audio sample, and n−1 is the immediately preceding audio sample.

$$f(sample_n) \leftrightarrow (f(sample_{n-1} - sample_n)) \qquad \text{(Eq. 1)}$$

Through this comparison, it is determined whether it is more power efficient to send the current audio sample or just the difference between the current audio sample and the previous audio sample.

Figure 2:
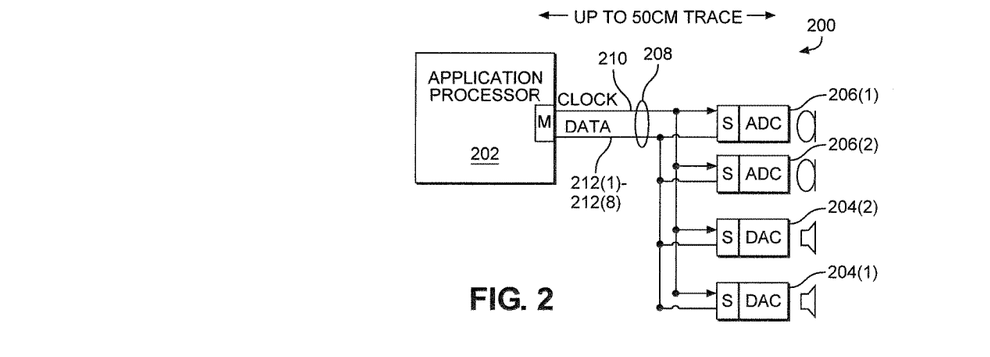
FIG. 2 is a simplified block diagram of an exemplary audio system using a SOUNDWIRE audio bus to transport audio data that incorporates exemplary power conservation techniques.

While SLIMBUS is one audio bus that uses NRZI encoding, SOUNDWIRE is another such audio bus. In this regard, FIG. 2 is block diagram of an exemplary SOUNDWIRE audio system 200. The SOUNDWIRE audio system 200 includes an application processor 202 coupled to a plurality of microphones 204(1)-204(2) and a plurality of speakers 206(1)-206(2) by a multi-wire bus 208. The multi-wire bus 208 includes a clock line 210 and one or more (up to eight) data lines 212(1)-212(8). The application processor 202 is generally regarded as a master of the SOUNDWIRE audio system 200, and the plurality of microphones 204(1)-204(2) and the plurality of speakers 206(1)-206(2) (as well as any other audio components) are slaves. It should further be appreciated that the microphones 204(1)-204(2) are examples of audio sources, and the speakers 206(1)-206(2) are examples of audio sinks. The application processor 202 may be an audio source or an audio sink as is well understood. While illustrated as the application processor 202, it should be appreciated that the application processor 202 could be replaced by a codec (not illustrated).

Figure 3:
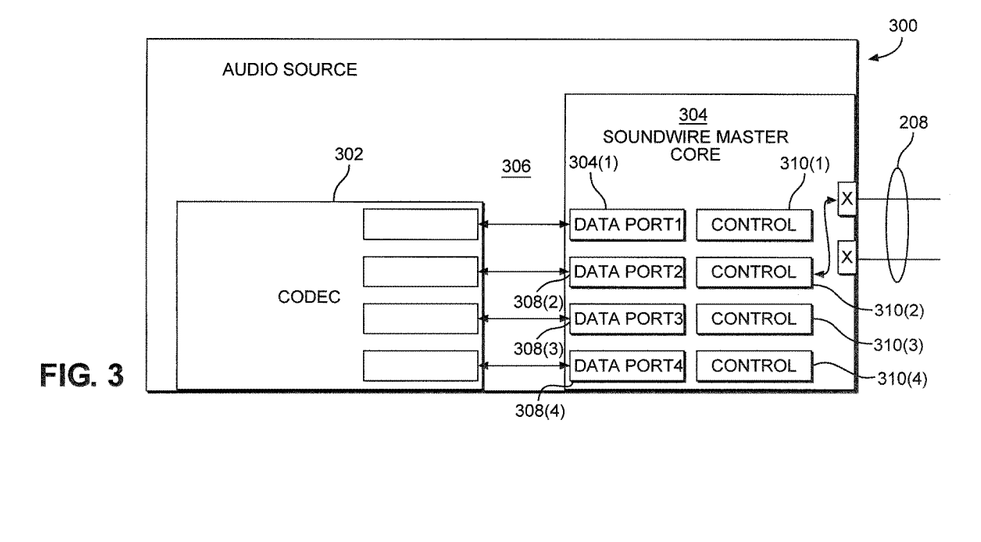
FIG. 3 is a simplified block diagram of an audio source that may be present on the audio buses of the audio systems of FIG. 1 or 2.
Figure 4:
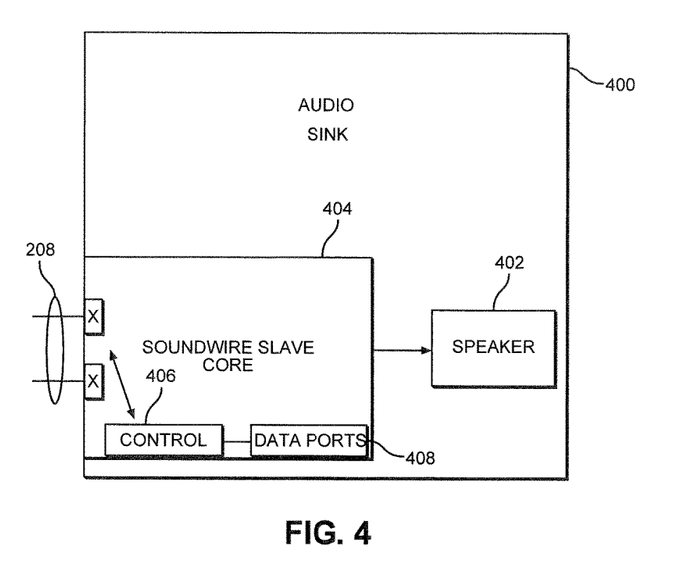
FIG. 4 is a simplified block diagram of an audio sink that may be present on the audio buses of the audio systems of FIG. 1 or 2.
Figure 5:
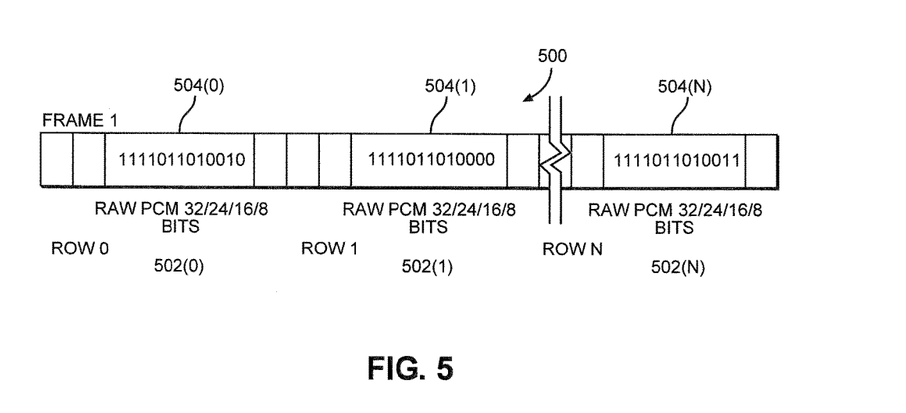
FIG. 5 is a simplified representation of a SOUNDWIRE frame that may be sent over a data lane of a conventional SOUNDWIRE audio bus.

FIGS. 3 and 4 provide more detailed illustrations of an audio source and an audio sink, respectively. For the purposes of illustration, FIG. 3 provides a SOUNDWIRE audio source 300 and FIG. 4 provides a SOUNDWIRE audio sink 400.

In this regard, the SOUNDWIRE audio source 300 of FIG. 3 may be an application processor, which includes a codec 302 that communicates with a SOUND WIRE master core 304 through an internal bus 306. In particular, the internal bus 306 may be coupled to data ports 308(1)-308(4) in the SOUNDWIRE master core 304. Each data port 308(1)-308(4) may be associated with a respective control system 310(1)-310(4) which places data onto the multi-wire bus 208 through a transmitter coupled to a bus interface (not illustrated explicitly). It should be appreciated that the codec 302 may perform PCM encoding on an audio stream, and the control systems 310(1)-310(4) may perform the NRZI encoding as modified by the process of FIG. 6.

Similarly, FIG. 4 illustrates the SOUNDWIRE audio sink 400, which may include a speaker 402 and a SOUNDWIRE slave core 404. The SOUNDWIRE slave core 404 includes a control system 406 that includes a receiver that receives and decodes the NRZI encoded data from the multi-wire bus 208 through a bus interface (not illustrated explicitly) and passes the data to a respective data port 408 having a demodulator or decoder (not shown) that demodulates or decodes the PCM audio sample for playback through the speaker 402.

In conventional audio systems, the audio data may be initially encoded with a PCM encoder or may be stored in memory as PCM-encoded data. The use of PCM encoding in this context is largely historically driven, but PCM encoding has proven adequate for many purposes and there is currently no strong movement away from PCM in the industry. Accordingly, the PCM-encoded data is provided to an NRZI transport layer encoder which transitions for each one present in the PCM-encoded data. Statistically, approximately 50% of the data will be ones, and accordingly, there may be many transitions for any given audio stream. An exemplary conventional SOUNDWIRE frame 500 holding raw PCM data is provided in FIG. 5. The SOUNDWIRE frame 500 includes multiple rows 502(0)-502(N), each having a packet 504(0)-504(N) of raw PCM bits and conventional header bits as is well understood. Thus, because the data is statistically about 50% ones, the power consumption by the transitions is relatively stable. However, if the number of ones transmitted were reduced, power savings could be achieved.

It should be appreciated that in a typical audio stream the data between one sample and the adjacent samples changes by only a small amount. Thus, the difference between adjacent audio samples is relatively small. When this fact is applied to a PCM-encoded audio sample, it is possible to reduce how many ones are transmitted by selectively sending just the difference between the adjacent audio samples when that difference has fewer ones than the current audio sample. By sending fewer ones over an NRZI bus, power savings are achieved. The process 600 illustrated in FIG. 6 is an exemplary aspect of this concept. Note that the process 600 can be performed for each channel for each port separately.

Figure 7:
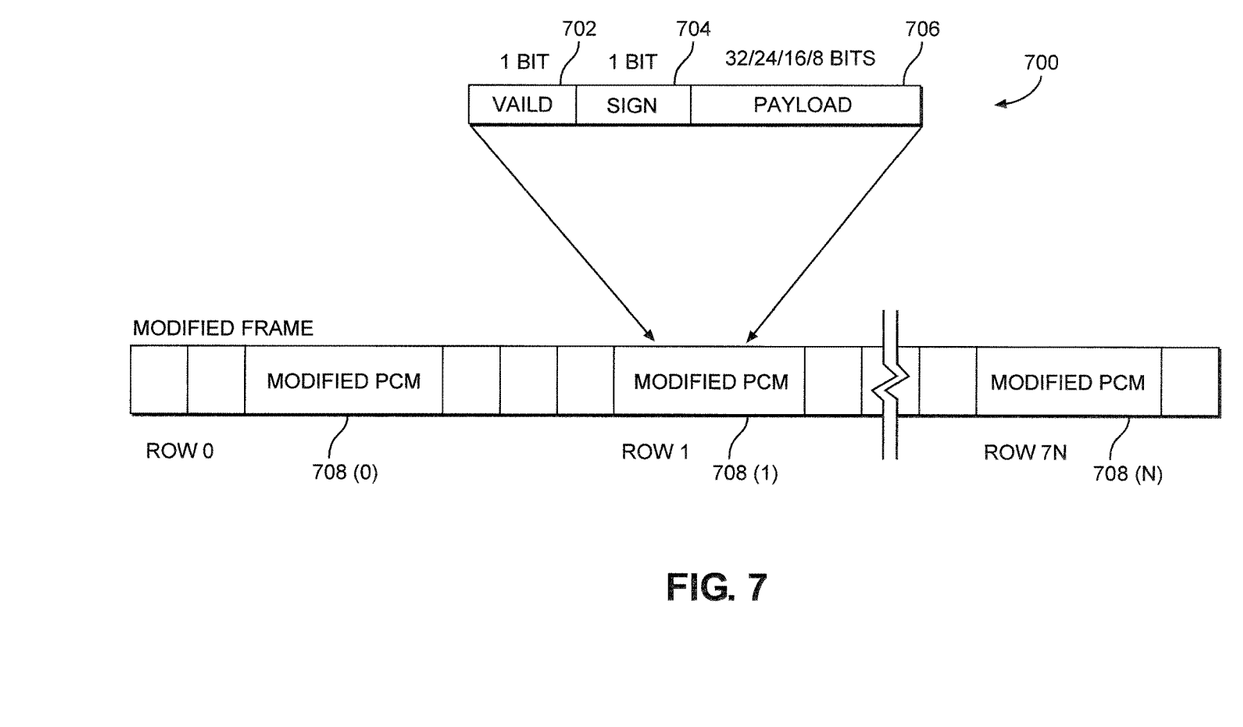
FIG. 7 is a simplified representation of a SOUNDWIRE frame according to an exemplary aspect of the present disclosure.

The process 600 begins by sending an initial PCM sample at instant i0 (block 602). The initial PCM sample is provided in a frame such as frame 700 illustrated in FIG. 7. The frame 700 includes a valid bit 702 and a sign bit 704 (collectively referred to as signaling bits) as well as a payload packet 706. Note that, generically, the valid bit 702 is an indication of whether the frame 700 includes a PCM sample or a difference value. Likewise, generically, the sign bit 704 is an indication of sign direction for a difference value. While single bits are contemplated, other indications may be used without departing from the present disclosure. In an exemplary aspect, the valid bit 702 is set to one when the current sample is valid and set to zero when a difference value is valid. Likewise, the sign bit 704 may be defined to be zero when the sign of the difference value is negative and one when the sign of the difference value is positive. These definitions may be inverted if desired so long as the audio source and the audio sink know what the definition is. Collectively, FIG. 7 illustrates the valid bit 702, the sign bit 704, and the payload packet 706 as a "Modified PCM" 708(0)-708(N), each corresponding to a row within the frame 700.

Accordingly, at block 602 in FIG. 6, the valid bit 702 and the sign bit 704 of the initial PCM sample are set to zero. The initial PCM sample is stored (block 604) such as in a register (not illustrated). This initial PCM sample becomes the first "previous sample" used in the difference calculation. A second PCM sample at instant it (current sample) is acquired (block 606) and stored (block 607). This current sample will initially be used as the current sample in the difference calculation and the comparison and subsequently will become the next "previous sample" to be compared to a subsequently acquired new current sample. The respective control system 310(1)-310(4) calculates the difference in the number of ones between the current sample and the previous sample (e.g., i1−i0) (block 608). The difference will include not just the magnitude of the difference, but also the sign (i.e., direction of the difference). Having calculated the difference (i.e., current sample minus previous sample) at block 608, the control system 310(1)-310(4) performs respective "bin" operations on an absolute value of the difference just calculated (bin(difference)) and the current sample (bin(current sample)) (block 610). That is, as defined above, the "bin" function causes the control system 310(1)-310(4) to perform an operation that counts the number of ones in the difference and another operation that counts the number of ones in the current sample. Alternatively, the bin operation could count the number of zeros. It should be appreciated that such $bin_{zero}$ operation inverts the comparison below or could be used to derive the $bin_{one}$ operation through simple subtraction (i.e., $bin_{one}+bin_{zero}$=the total number of bits in the sample, so knowing one allows derivation of the other).

With continued reference to FIG. 6, the process 600 continues by determining when the bin(difference) is greater than the bin(current sample) (block 612).

$$\text{Bin(difference)} > \text{bin(current sample)} \quad \text{(Eq. 2)}$$

Note that this determination may also include minor summation to include the valid bit 702 and the sign bit 704 that would be sent in both possibilities.

$$\text{Bin(difference)+sign+valid} > \text{bin(current sample)+sign+valid} \quad \text{(Eq. 3)}$$

However, it is possible to define these bits in such a manner that they effectively cancel one another out and may be ignored. For example, if the valid bit 702 is zero for the difference being sent and one for the current sample being sent, then Eq. 3 becomes:

$$\text{Bin(difference)+0(valid)+sign} > \text{bin(current sample)+1(valid)+sign} \quad \text{(Eq. 4)}$$

Further, if the sign bit 704 is always set to zero when a current sample is being sent, then at worst, Eq. 4 becomes:

$$\text{Bin(difference)+0(valid)+1(sign)} > \text{bin(current sample)+1(valid)+0(sign)} \quad \text{(Eq. 5)}$$

The ones may be subtracted from each side and the control system 310(1)-310(4) may use Eq. 2. Alternatively, the control system 310(1)-310(4) may track the sign bit 704 and use Eq. 3 in the determination of block 612. When the bin(difference) side is not greater, the control system 310(1)-310(4) sets the valid bit 702 to zero, sets the appropriate sign bit 704, and sets the packet to the difference value (block 614). However, when the bin(difference) side is greater, the control system 310(1)-310(4) sets the valid bit 702 to one, sets the sign bit to zero, and sets the packet to the current sample (block 616). Having populated the packet, the control system 310 sends the packet (block 618). The control system 310(1)-310(4) changes the current sample to the previous sample (block 620) and loops back to block 606 to acquire a new current sample and repeat the process. Note that the acquisition of new current samples, comparison, and sending is a continuous process and there may be minor temporal variations as a new sample may be acquired before a previous packet is sent without departing from the scope of the present disclosure.

Note that when the two values are equal, the designers may select whether the difference or the current audio sample is sent. That is, when the values are equal, a first exemplary aspect sends the original current audio sample and a second exemplary aspect sends the difference.

On the other end of the audio bus, the audio sink must be able to determine what data is in the packet and, as needed, recreate the audio sample from the difference information and the previously received audio sample. A process 800 is provided with reference to FIG. 8 setting forth such a process. In this regard, the process 800 begins with the audio sink 400 receiving the packet with an initial audio sample (block 802). The control system 406 of the audio sink 400 begins passing the initial audio sample to the speaker 402 for playback (block 804). The control system 406 further stores the initial audio sample (block 806) such as in a register. The audio sink 400 continues to receive packets from the audio source 300 and thus, receives the next packet (block 808). The control system 406 checks the valid bit 702 (block 810). When the valid bit 702 is valid, that signifies that the audio source 300 has sent an actual audio sample, and the control system 406 stores the audio sample (block 812). This storage may overwrite a previously stored audio sample, or may use a new register as need or desired. The audio sink 400 continues playing audio packets, including the packet just received (block 814), and the process 800 loops back to receive the next audio packet at block 808.

Figure 8:
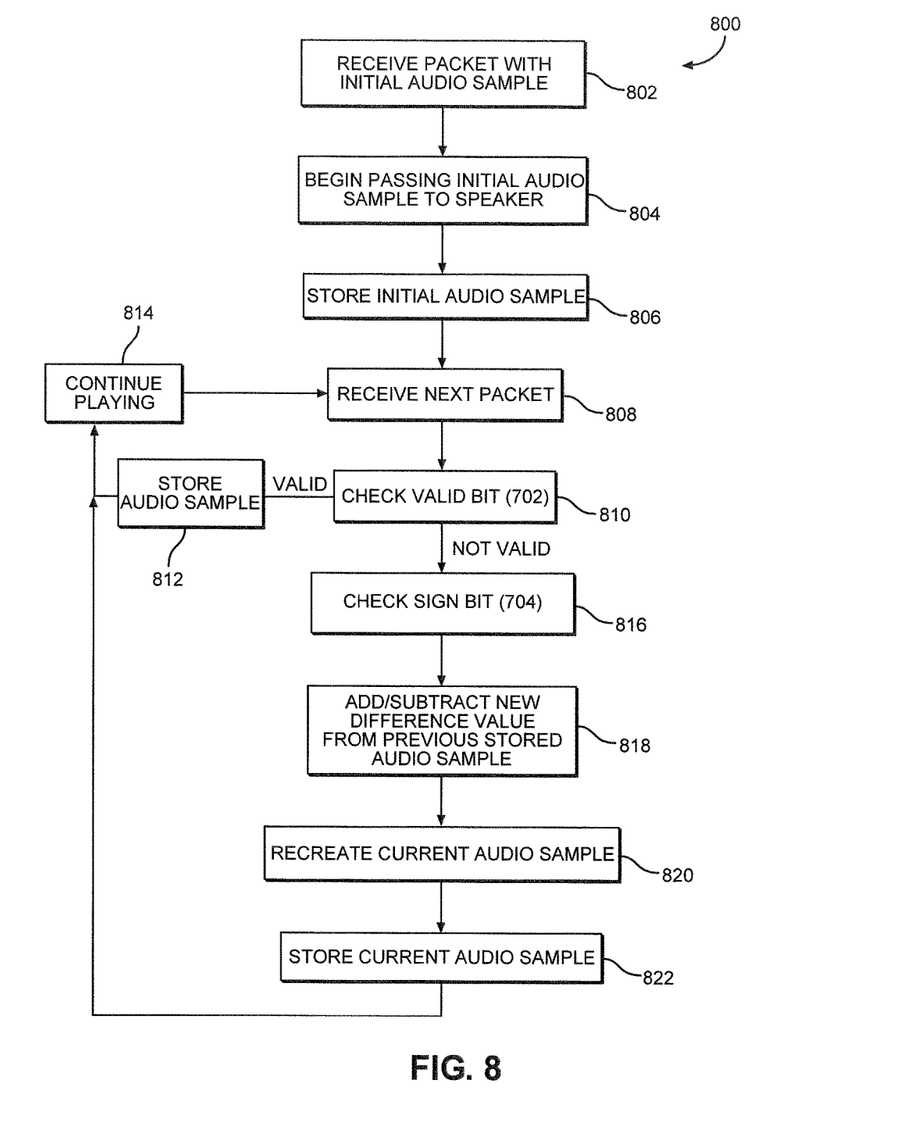
FIG. 8 is a flowchart illustrating an exemplary process for an audio sink to handle incoming audio packets formed through the process of FIG. 6.

With continued reference to FIG. 8, if the valid bit 702 indicates that the audio sample in the packet is not valid (i.e., the data in the packet is a difference value), then the control system 406 checks the sign bit 704 (block 816). The control system 406 uses the sign bit 704 to determine when to add or subtract the new difference value in the packet with the previously stored audio sample (block 818). Based on this calculation, the control system 406 recreates the current audio sample (block 820), stores the current audio sample (block 822), and continues playing (block 814).

While the above examples have focused on a SOUNDWIRE audio system, it should be appreciated that the audio system 100 that uses a SLIMBUS audio bus may also use the teachings described herein without departing from the scope of the present disclosure.

The systems and methods for power conservation in an audio bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 9:
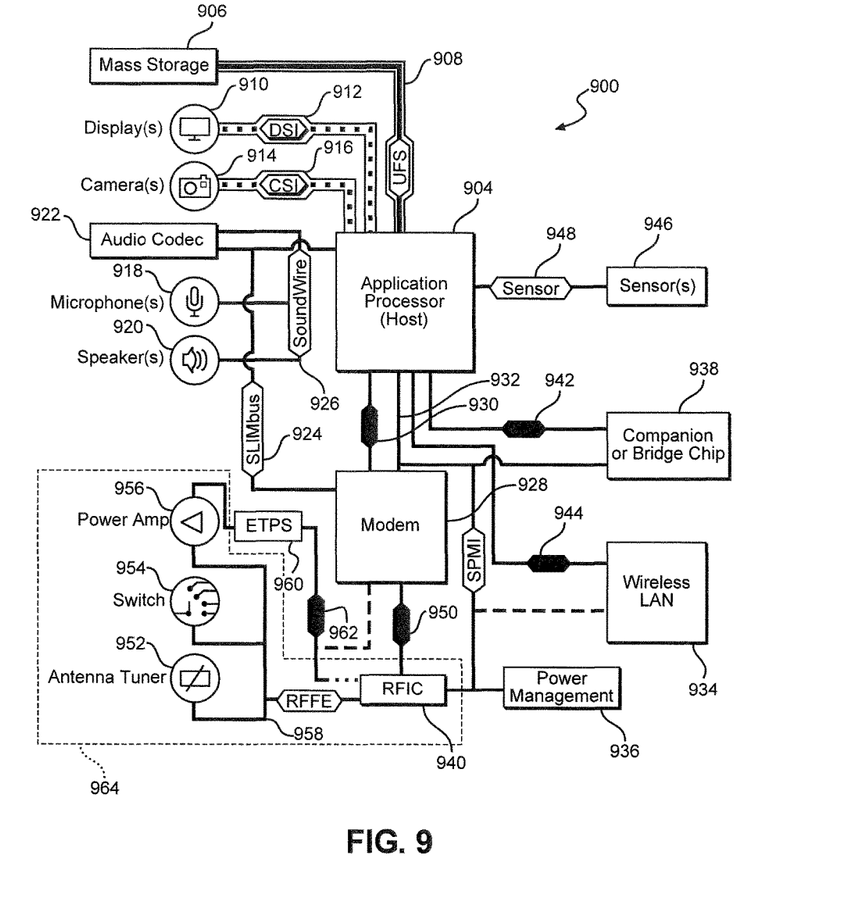
FIG. 9 is a block diagram of an exemplary processor-based system that can include the SOUNDWIRE and SLIMBUS audio systems of FIGS. 1 and 2 that perform the processes of FIGS. 6 and 8.

In this regard, FIG. 9 is a system-level block diagram of an exemplary mobile terminal 900, such as a smart phone, mobile computing device tablet, or the like, that can include the SOUNDWIRE and SLIMBUS audio systems of FIGS. 1 and 2 that perform the processes of FIGS. 6 and 8. While a mobile terminal having a SLIMBUS or SOUNDWIRE bus is particularly contemplated as being capable of benefiting from exemplary aspects of the present disclosure, it should be appreciated that the present disclosure is not so limited and may be useful in any system having a time division multiplexed (TDM) bus.

With continued reference to FIG. 9, the mobile terminal 900 includes an application processor 904 (sometimes referred to as a host) that communicates with a mass storage element 906 through a universal flash storage (UFS) bus 908. The application processor 904 may further be connected to a display 910 through a display serial interface (DSI) bus 912 and a camera 914 through a camera serial interface (CSI) bus 916. Various audio elements such as a microphone 918, a speaker 920, and an audio codec 922 may be coupled to the application processor 904 through a SLIMBUS 924. Additionally, the audio elements may communicate with each other through a SOUNDWIRE bus 926. A modem 928 may also be coupled to the SLIMbus 924 and/or the SOUNDWIRE bus 926. The modem 928 may further be connected to the application processor 904 through a peripheral component interconnect (PCI) or PCI express (PCIe) bus 930 and/or a system power management interface (SPMI) bus 932.

With continued reference to FIG. 9, the SPMI bus 932 may also be coupled to a wireless local area network (LAN or WLAN) IC (LAN IC or WLAN IC) 934, a power management integrated circuit (PMIC) 936, a companion IC (sometimes referred to as a bridge chip) 938, and a radio frequency IC (RFIC) 940. It should be appreciated that separate PCI buses 942 and 944 may also couple the application processor 904 to the companion IC 938 and the WLAN IC 934. The application processor 904 may further be connected to sensors 946 through a sensor bus 948. The modem 928 and the RFIC 940 may communicate using a bus 950.

With continued reference to FIG. 9, the RFIC 940 may couple to one or more RFFE elements, such as an antenna tuner 952, a switch 954, and a power amplifier 956 through a radio frequency front end (RFFE) bus 958. Additionally, the RFIC 940 may couple to an envelope tracking power supply (ETPS) 960 through a bus 962, and the ETPS 960 may communicate with the power amplifier 956. Collectively, the RFFE elements, including the RFIC 940, may be considered an RFFE system 964. It should be appreciated that the RFFE bus 958 may be formed from a clock line and a data line (not illustrated).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method for handling data on an audio bus, comprising:
    sending a first pulse code modulated (PCM) audio sample to an audio sink over a non-return to zero inverted (NRZI) audio bus;
    determining a difference value reflecting a difference in a first number of ones in the first PCM audio sample to a second number of ones in a second PCM audio sample;
    when the second number of ones is less than the difference value, sending the second PCM audio sample to the audio sink; and
    when the second number of ones is greater than the difference value, sending the difference value to the audio sink.

2. The method of claim 1, further comprising determining that an audio sample is a PCM audio sample.

3. The method of claim 1, wherein sending the first PCM audio sample to the audio sink comprises sending from an audio source.

4. The method of claim 1, wherein determining the difference value comprises considering a number of ones used as signaling bits on the NRZI audio bus.

5. The method of claim 4, wherein considering the number of ones used as the signaling bits comprises considering two signaling bits.

6. The method of claim 1, further comprising sending the difference value when the second number of ones is equal to the difference value.

7. The method of claim 1, further comprising sending the second PCM audio sample when the second number of ones is equal to the difference value.

8. The method of claim 1, wherein the NRZI audio bus comprises a SOUND WIRE audio bus.

9. The method of claim 1, wherein the NRZI audio bus comprises a SLIMBUS audio bus.

10. The method of claim 1, further comprising sending an indication that the difference value is being sent.

11. The method of claim 10, further comprising sending an indication of a direction of the difference when the difference value is sent.

12. An audio source comprising:
    an audio bus interface configured to be coupled to a non-return to zero inverted (NRZI) audio bus;
    a transmitter configured to send a first pulse code modulated (PCM) audio sample to an audio sink over the NRZI audio bus; and
    a control system configured to:
        determine a difference value reflecting a difference in a first number of ones in the first PCM audio sample to a second number of ones in a second PCM audio sample;
        when the second number of ones is less than the difference value, cause the transmitter to send the second PCM audio sample to the audio sink; and when the second number of ones is greater than the difference value, cause the transmitter to send the difference value to the audio sink.

13. The audio source of claim 12, further comprising a first audio sample register configured to store the first PCM audio sample.

14. The audio source of claim 13, further comprising a second audio sample register configured to store the second PCM audio sample.

15. The audio source of claim 12, wherein the audio bus interface comprises a SOUNDWIRE audio bus interface.

16. The audio source of claim 12, wherein the audio bus interface comprises a SLIMBUS audio bus interface.

17. The audio source of claim 12, wherein the control system is further configured to consider a number of ones used as signaling bits on the NRZI audio bus.

18. The audio source of claim 12, wherein the control system is further configured to cause the transmitter to send an indication that the difference value is being sent.

19. The audio source of claim 18, wherein the control system is further configured to cause the transmitter to send an indication of a direction of the difference when the difference value is sent.

20. The audio source of claim 12 integrated into an integrated circuit (IC).

21. The audio source of claim 12 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. An audio sink comprising:
an audio bus interface configured to be coupled to a non-return to zero inverted (NRZI) audio bus;
a receiver configured to receive a first pulse code modulated (PCM) audio sample from an audio source over the NRZI audio bus; and
a control system configured to:
detect an indication that a difference value has been sent from the audio source over the NRZI audio bus;
determine a direction of a difference from a sign indication;
use the difference value and the direction of the difference with the first PCM audio sample to derive a second PCM audio sample; and
pass the second PCM audio sample to a demodulator.

23. The audio sink of claim 22 further comprising the demodulator.

24. The audio sink of claim 23, further comprising a speaker communicatively coupled to the demodulator.

25. The audio sink of claim 22, wherein the audio bus interface comprises a SOUNDWIRE audio bus interface.

26. The audio sink of claim 22, wherein the audio bus interface comprises a SLIMBUS audio bus interface.

27. A non-transitory computer-readable medium having stored thereon computer executable instructions which, when executed by a processor, cause the processor to:
send a first pulse code modulated (PCM) audio sample to an audio sink over a non-return to zero inverted (NRZI) audio bus;
determine a difference value reflecting a difference in a first number of ones in the first PCM audio sample to a second number of ones in a second PCM audio sample;
when the second number of ones is less than the difference value, send the second PCM audio sample to the audio sink; and
when the second number of ones is greater than the difference value, send the difference value to the audio sink.

* * * * *